(12) United States Patent
Scott

(10) Patent No.: US 8,235,092 B2
(45) Date of Patent: Aug. 7, 2012

(54) INSULATED INVESTMENT CASTING MOLD AND METHOD OF MAKING

(75) Inventor: David H Scott, Bristol, TN (US)

(73) Assignee: Minop Co., Midway, TN (US)

( * ) Notice: Subject to any disclaimer, the term of this patent is extended or adjusted under 35 U.S.C. 154(b) by 0 days.

(21) Appl. No.: 12/814,790

(22) Filed: Jun. 14, 2010

(65) Prior Publication Data

US 2011/0114279 A1    May 19, 2011

Related U.S. Application Data

(63) Continuation-in-part of application No. 11/668,709, filed on Jan. 30, 2007, now abandoned.

(51) Int. Cl.
*B22C 9/04* (2006.01)

(52) U.S. Cl. .......................... 164/516; 164/35

(58) Field of Classification Search .......... 164/516–519, 164/34, 35
See application file for complete search history.

(56) References Cited

U.S. PATENT DOCUMENTS

| | | | |
|---|---|---|---|
| 3,367,393 A | 2/1968 | Lenahan et al. | |
| 3,654,984 A | 4/1972 | Mellen, Jr. et al. | |
| 3,723,584 A | 3/1973 | Nussbaum | |
| 4,186,222 A | 1/1980 | Sellars et al. | |
| 4,744,849 A | 5/1988 | Michaud-Soret | |
| 5,143,777 A | 9/1992 | Mills | |
| 5,164,004 A | 11/1992 | Kurty | |
| 5,217,929 A | 6/1993 | Taft | |
| 5,297,615 A | 3/1994 | Aimone et al. | |
| 6,013,902 A * | 1/2000 | Shimp et al. ............... | 219/451.1 |
| 6,403,153 B1 | 6/2002 | Frul | |
| 6,629,559 B2 | 10/2003 | Sachs et al. | |
| 7,258,158 B2 | 8/2007 | Kilinski et al. | |
| 2006/0134455 A1 | 6/2006 | Belhadjhamida et al. | |
| 2008/0023031 A1 | 1/2008 | Kellar et al. | |

FOREIGN PATENT DOCUMENTS

| | | |
|---|---|---|
| DE | 3334457 A1 | 4/1985 |
| EP | 502580 A1 | 9/1992 |
| FR | 1515784 A | 3/1968 |
| FR | 2654655 A1 | 5/1991 |
| GB | 1410634 A | 10/1975 |
| JP | 5749303 B2 | 10/1982 |
| JP | 62168632 A | 7/1987 |
| JP | 4259509 A | 9/1992 |

* cited by examiner

*Primary Examiner* — Kuang Lin
(74) *Attorney, Agent, or Firm* — Middleton Reutlinger; Charles I. Sherman; John F. Salazar

(57) ABSTRACT

An insulated investment casting shell mold is made by first mixing at least one refractory material with a slurry vehicle forming a prime coat slurry, and optionally mixing at least one refractory material with a slurry vehicle forming a backup slurry. The prime slurry is coated onto a fugitive pattern and optionally dried and/or stuccoed wherein the stucco has at least one refractory material. Optionally, at least one coat of the backup slurry is applied to the prime coated fugitive pattern and optionally dried and/or stuccoed after each coat of the backup slurry. The backup and stucco may be applied a plurality of times to obtain a desired shell wall thickness. An insulating slurry is formed by introducing gas into a slurry vehicle having at least one refractory material and containing a stabilizer and a foaming agent wherein gaseous bubbles become entrained therein forming an insulating slurry having closed porosity therein. The insulating slurry is coated onto at least one portion of the pattern after the prime coat and preferably at least a portion of the outermost layer of a backup coated pattern has the insulating slurry thereon.

25 Claims, 2 Drawing Sheets

| Ex.# | Fused Si grams | Thickener grams | Fiber grams | Water grams | Colloidal Si grams | Foaming Agent ml * | Stabilizer ml |
|---|---|---|---|---|---|---|---|
| 1 | 2500.0 | 45.4 | 22.7 | 150.0 | 1362.0 | 25.0 | 15.0 |
| 2 | 2500.0 | 22.7 | 22.7 | 150.0 | 1362.0 | 25.0 | 15.0 |
| 3 | 2500.0 | 68.1 | 22.7 | 150.0 | 1362.0 | 25.0 | 15.0 |
| 4 | 2500.0 | 45.4 | 11.4 | 150.0 | 1362.0 | 25.0 | 15.0 |
| 5 | 2500.0 | 45.4 | 34.1 | 150.0 | 1362.0 | 25.0 | 15.0 |
| 6 | 2500.0 | --- | 22.7 | 150.0 | 1362.0 | 25.0 | 15.0 |
| 7 | 2500.0 | 45.4 | --- | 150.0 | 1362.0 | 25.0 | 15.0 |
| 8 | 2500.0 | 45.4 | 0.1 | 150.0 | 1362.0 | 37.5 | 15.0 |
| 9 | 2500.0 | 45.4 | 22.7 | 150.0 | 1362.0 | 12.5 | 15.0 |
| 10 | 2500.0 | 45.4 | 0.1 | 150.0 | 1362.0 | 25.0 | 7.5 |
| 11 | 2500.0 | 45.4 | 22.7 | 150.0 | 1362.0 | 25.0 | 15.0 |
| 12 | 2500.0 | 22.7 | 22.7 | 150.0 | 1362.0 | 25.0 | 15.0 |
| 13 | 2500.0 | 68.1 | 22.7 | 150.0 | 1362.0 | 25.0 | 15.0 |
| 14 | 2500.0 | 45.4 | 11.4 | 150.0 | 1362.0 | 25.0 | 15.0 |
| 15 | 2500.0 | 45.4 | 34.1 | 150.0 | 1362.0 | 25.0 | 15.0 |
| 16 | 2500.0 | --- | 22.7 | 150.0 | 1362.0 | 25.0 | 15.0 |
| 17 | 2500.0 | 45.4 | --- | 150.0 | 1362.0 | 25.0 | 15.0 |
| 18 | 2500.0 | 45.4 | 0.1 | 150.0 | 1362.0 | 37.5 | 15.0 |
| 19 | 2500.0 | 45.4 | 22.7 | 150.0 | 1362.0 | 12.5 | 15.0 |
| 20 | 2500.0 | 45.4 | 0.1 | 150.0 | 1362.0 | 25.0 | 7.5 |

* The foaming agent used in examples 1-10 was AS40™ and in examples 11-20 was D40™

Figure 1

| Example # | Temp. °C | Thermal Diffusivity cm²/s | Specific Heat Capacity J/(kg·K) | Bulk Density at room temp. Kg/m³ | Thermal Conductivity W/(m·K) |
|---|---|---|---|---|---|
| 21 | 25 | 0.0165 | 914.8 | 1472.3 | 2.22 |
| 21 | 302 | 0.0083 | 1042.5 | 1472.3 | 1.27 |
| 21 | 800 | 0.0083 | 1312.2 | 1472.3 | 1.6 |
| 21 | 1372 | 0.0099 | * | 1472.3 | * |
| 22 | 25 | 0.0145 | 902.3 | 1436.9 | 1.88 |
| 22 | 301 | 0.0077 | 1013.7 | 1436.9 | 1.12 |
| 22 | 800 | 0.0082 | 1056.7 | 1436.9 | 1.25 |
| 22 | 1372 | 0.0093 | * | 1436.9 | * |

* Data not obtained due to disintegration of platinum at temperature

Figure 2

INSULATED INVESTMENT CASTING MOLD AND METHOD OF MAKING

CROSS-REFERENCE TO RELATED APPLICATIONS

This continuation-in-part application under 35 USC §120 claims priority to, and benefit from, U.S. application Ser. No. 11/668,709 filed on Jan. 30, 2007, entitled "Insulated Casting Mold and Method of Making" now abandoned.

FIELD OF INVENTION

This invention relates generally to casting and more specifically to an investment casting shell mold and a method of making investment casting shell molds.

BACKGROUND OF THE INVENTION

A substantial number of metal castings are created by pouring molten metal into a sand or investment casting shell mold. Sand casting is typically performed when the article need not have intricate detail or is later machined and the mold is typically made of sand held together with various binders. In investment casting, the mold is typically made of refractory materials bound together with various binders. Investment casting shell molds are used typically when a precision cast article is desired.

An investment casting shell mold is made by first providing a fugitive pattern of the article to be cast. The pattern is made of a material that will be melted or burn away at a later stage in the process of making an investment casting shell mold. The pattern material is most often times wax, hence the process is often referred to as lost wax casting. This pattern is dipped into a slurry having refractory materials forming a coating thereon.

The fugitive pattern is coated by first dipping with prime coat slurry having a controlled composition and rheology. Typically, the prime coat slurry forming the innermost layer of the mold is composed of relatively fine grained refractory materials so that a less porous surface of the mold contacts the metal. In multi-layered molds, the first or prime coat slurry usually has a higher viscosity than subsequent or backup coat slurries and the refractory materials contained therein typically is of finer particle size so as to produce a smoother cast surface. Backup coats are typically produced using coarser grit sizes, fibers, and lower viscosity slurries. After the application of the prime coat, the dipped pattern then receives a stucco coating of dry refractory materials and is gelled and/or gas dried, preferably air dried in a controlled environment of humidity/temperature. The prime coat slurry and optional stucco typically have refractory materials such as alumina, silica, aluminosilicates, zirconium silicate, and ceramics of a controlled particle size range. The slurries have a binder material which often has colloidal silica. After the coated pattern is dried it is subsequently dipped in the same or different slurry and optionally receives another stucco coating and dried again and/or gelled. The coated shell is repeatedly dipped into a slurry and optionally coated with stucco, gelled, and/or dried after each dip. The succession of slurries and optional stuccos may be the same or different materials and are applied until a desired build up of refractory materials are obtained on the pattern. Each slurry is typically of a carefully controlled composition and rheology. Each stucco typically has coarse refractory materials. Several refractory materials, such as fused silica, fused alumina, tabular alumina and fused or sintered aluminosilicates are some examples of refractory materials used in the stucco. Purified and graded natural sands, for example zirconium silicate and quartz sands are sometimes also used. The desired mold is built-up in this fashion with several slurry and stucco repeat coatings until the desired mold thickness is achieved. The wax pattern is finally removed, usually in a steam autoclave, to leave a mold cavity having a desired shape. The resulting "green" or unfired mold is then fired under a precisely controlled heating cycle to increase its strength and to burn off any residual wax.

Investment casting molds need to be dimensionally stable, inert, and to have good thermal characteristics depending on the type of alloy being cast, the geometry of the cast article, and the nature of the metallurgical structure. Different casting techniques or techniques for the solidification of the cast metal result in different metal grain structures in the resulting casting which affects the strength of the resulting article. Often times a precision cast article having thin metal structures within is desired to have a selected metal grain structure, as in the production of turbo charger rotors and turbine blades. Typically, an equiaxed or a directional grain structure is desired. An equiaxed grain structure is typically accomplished by pouring molten metal into a preheated investment casting mold which is then allowed to cool by conduction of heat from the molten metal through each layer of the investment casting mold where the heat radiates from the exterior surface of the mold. The metal solidifies by nucleation and growth at many sites throughout the casting providing an equiaxed grain structure. Directional solidification is where the article is solidified either in polycrystalline form with a structure made up of directionally aligned columnar crystals or it is solidified in the form of a single crystal.

In the production of a precision cast article having thinner metal structures within the thinner casting sections are prone to premature solidification which causes defects such as undesired grain structure, cold-shuts, misruns, shrinkage, and the formation of voids. Therefore, investment casting molds must exhibit proper thermal characteristics such as heat removal rates and controlled cooling stresses to ensure the metal is cooled in a controlled manner. A temperature which is too low, particularly for castings with thin sections can cause premature chilling of the metal. This will result in a loss of molten metal fluidity and local variations in mold temperature causing variable solidification rates, no-fill defects, and/or undesirable metallurgical structures (i.e. little grain growth and/or fine grain structure) in the finished casting.

In the past, it was also felt that bubbles in the investment casting molds were undesirable and to prevent their formation, anti-foaming agents were widely used in the industry in investment casting slurries.

Typically, molds are pre-heated from 1800° F. up to actual metal casting temperature so that the molten metal can best fill the mold cavity without solidifying prematurely and wrapped in a refractory fiber insulating blanket, such as an asbestos and/or a kaolin fiber blanket, to maintain a correct mold temperature during the cooling process. The wrapping of shell molds with an insulating blanket is fairly labor intensive, and has required the use of hand cut and formed fiber insulation blankets which have to be fitted around a mold, all at significant expense. The procedure has varied results and the success of the procedure depends upon the skill of the operator. Small variations can prove critical to the quality of the finished casting. Furthermore, asbestos is associated with serious health hazards which makes it desirable to eliminate its use. To minimize the problems associated with wrapping investment casting shell molds, other solutions of controlling the cooling of the investment casting molds have been sought.

The cooling of investment casting molds has been controlled by incorporating in one or more layers of the mold fugitive particles such as cork, wood, plastic or other destructible material which burns out of the shell in the firing process forming voids therein. Heat destructible grains and fibers have also been included in the stucco for forming voids. Another approach that has been taken is introduction of hollow grains or bubbles such as bubbled grains of alumina into the slurry. Problems associated with these approaches have been found to include minimal or negligible effect in the reduction of heat transfer such as in the use of heat conductive alumina and the expense associated with added materials, process steps or complexity, and associated costs. Therefore, there remains a need for an alternative method for controlling or slowing the cooling of a filled investment casting mold.

SUMMARY OF THE INVENTION

The present invention provides an investment casting shell mold and method of making. The insulated investment casting shell mold is an improved alternative to the prior art means of controlling or slowing the cooling of a filled investment casting shell mold in order to prevent finished metal defects such as no-fill and undesired grain structure in the finished article. Such defects can be prevalent in parts with thin cross-section areas where rapid cooling of the molten metal is more likely to occur. Rapid cooling of the molten metal within the shell mold can cause a loss of molten metal fluidity resulting in no-fill defects, and a lack of time at a given temperature resulting in undesirable metallurgical properties in the finished metal article. The method of making the insulated investment casting shell mold is applicable to the conventional manufacture of a refractory mold wherein a multi-layered shell is formed by successively coating and hardening slurries comprising a binder and a refractory material on a pattern and thereafter eliminating the pattern. When an investment casting shell mold is manufactured in accordance with the invention, its thermal insulating means is incorporated in situ within at least a portion of the wall of the shell itself. In accordance with the method, even distributions of void or gaseous spaces are embedded in at least a portion of at least one of the slurry coats subsequent to a prime coat.

The insulating material for an investment casting shell mold of the present invention comprises an aerated or other gaseous investment casting slurry wherein the gasses are entrained forming bubbles therein which produce closed porosity in the slurry, and has water and at least one refractory filler. The aerated slurry is preferably applied in at least one layer, or at least a portion thereof, after a primary layer and advantageously is applied in a final dip. Preferably, air or other gas is introduced to the slurry in the form of small bubbles by mixing or injecting air bubbles with a pump and retained therein during the drying process with the use of a foaming agent and a stabilizer. Additionally, the slurry may have a thickener such as a clay (i.e. bentonite clay), fibers (organic or inorganic), polymers, or other materials to affect the rheology of the slurry and performance characteristics of the shell mold. The aerated or bubbled slurry dip of the investment casting shell mold, preferably including the last dip, is dried resulting in a solid investment casting mold having at least a portion of layer, preferably the outer layer, with voids and therefor closed porosity therein thus acting as an insulating portion or layer. Preferably, the entrained air decreases the density of the slurry and consequently the dried insulator layer by at least 2% increasing the resistance to heat transfer through at least a portion of the investment casting shell mold.

BRIEF DESCRIPTION OF THE FIGURES

FIG. 1 shows the data of Examples 1-20 in tabular form.
FIG. 2 shows the data generated in the testing of the shell materials of Examples 22 and 23 in tabular form.

DETAILED DESCRIPTION OF THE INVENTION

The present invention provides an investment casting mold with at least one insulating portion and a method of making. This disclosure of the present invention is not to be interpreted as limiting the scope of the claims herein since multiple configurations and methods of making the insulated investment casting mold of the present invention will become apparent to one skilled in the art upon a reading of this disclosure.

A process of making an investment casting shell mold begins with the construction of a fugitive positive pattern of the desired metal casting from a thermoplastic material, wax, or other material that will melt, vaporize or burn away in a firing process. The positive pattern is typically prepared by an injection molding process producing patterns having the configuration and surface finish required for a metal casting. An investment casting shell mold is made by dipping the pattern into a refractory material containing slurry having relatively fine particulate refractory materials in a slurry vehicle such as an aqueous solution. Typically, a binder such as colloidal silica as well as various rheology modifiers and/or other additives are added to the slurry. A first slurry is used as a prime coat for the initial dip of the pattern forming an innermost layer that contacts the molten metal in a casting process. Typically, this prime coat slurry has a higher viscosity and smaller refractory grain or fiber size than slurries used in subsequent or backup dips. After the prime coat is placed on the pattern, a stucco is usually applied which typically has dry particulate or fibrous refractory materials. The grain or fiber size of the refractory materials in the stucco is typically larger than the grain or fiber size of the slurry to aid in creating shell wall thickness. The coated pattern is typically dried in a gas, for example air, having a predetermined humidity and temperature whereby the water or other slurry vehicle is at least partially evaporated. In this drying step, where most of the slurry vehicle is evaporated, it is not required to remove 100 percent of the liquid but only an amount sufficient to permit proper application of the next slurry as is understood in the art. The interval typically for the optional drying between coats may vary from about 30 minutes for refractory prime coats up to several hours for backup coats, depending on mold complexity and desired shell wall thickness. The processes steps of coating the pattern with a backup slurry, the optional application of a stucco, and the optional drying are repeated until a desired mold thickness and composition is obtained.

The slurries may vary in composition from one coat to the next. Typically, backup coat slurries are slurries other than a first or primary dip and have a composition of larger grain or fiber size refractory materials and lower viscosity than the prime coat slurry. Often times, fibers are introduced only into the backup slurry and/or stucco and not into the prime coat slurry. Completed shell molds are usually air dried up to an additional 24 hours or more forming a green investment casting shell. The green investment casting shell is dewaxed by introduction into a steam autoclave, immersion into boiling water, or flash dewaxing as is known in the art. The green casting shell is then fired or calcined in a furnace at about 1600° F. to about 2000° F. forming a stable investment casting shell mold. The heated shell mold is removed from the furnace and positioned and optionally preheated to receive molten metal. The molten metal may be poured statically or centrifugally from a ladle or a crucible, or introduced into the mold via the Hitchiner process, or introduced into the mold by other processes as are known in the art. The molten metal is then cooled to produce a solidified metal casting in the mold. The cooling is typically conducted by placing the filled investment casting shell mold in an open ambient air environment. The shell mold having the cooled and solidified metal casting is then broken apart yielding a metal casting in the shape of the pattern.

Refractory materials used in the slurries and stuccos are solids that substantially remain within the mold during the firing process. Examples include silica such as fused silica, or high silica content aluminosilicates such as mullite, kyanite, and molochite, or alumina such as aluminum oxide, or olivine, clay, ceramics, chromite, magnesia, quartz (cristobalite or trydymite), pyrophyllite, metal fibers, carbon (fibrous or particulate), graphite, carbides such as silicon carbide, zirconia such as zirconium silicate, zirconium oxide, and zirconite, and mixtures thereof. These refractory materials may be fibrous or granular, chopped or milled. The refractory materials can contain a variety of particle sizes as well as a wide range of fiber sizes. Attributes such as thermal conductivity may be considered in the makeup of refractory materials. For example, it may be desirable to incorporate silica to decrease the thermal conductivity of the refractory materials. The refractory materials used in the stucco may be the same as those used in the slurry but it may also be advantageous to include fused silica grains, fused alumina, and calcined clay or grog (i.e., alumino-silicate). Additionally, it may be advantageous to have larger particles in the stucco as compared to the slurry to aid in building shell wall thickness.

Various binders may be used in the slurries. Binders should be chemically stable to ensure long service from a refractory slurry used for repetitive dip coats. Binders also desirably form insoluble bonds with the refractory grains during drying between coats, to permit redipping of the pattern as well as to permit removal of the pattern during furnacing. A binder exhibiting increased air entrainment in a slurry is advantageous in the insulating material of the present invention. The stabilized ceramic bonds produced in the shell during furnacing must also have adequate fired strength and refractoriness so as to withstand the casting of molten metal. Binders typically used include colloidal silica, silica sol, acid phosphates, acid sulphates, ethyl silicate, colloidal alumina, sodium silicate, and colloidal zirconium. Other binders such as hydrolyzed ethyl silicate or isopropyl silicate require hardening to be carried out by gelling the slurry, perhaps in an atmosphere of ammonia gas or in air, cooling, or by means of chemical gelling agents. This gelling step is typically performed with or instead of the optional drying step after the various coats are applied. Other binders known in the art include ionic alkali metal silicates, and acid stable alumina modified colloidal silica. Various catalysts and/or accelerators may be employed with the ethyl silicate binder including magnesium oxide, aluminum oxide, aluminum hydroxide, ammonium carbonate, ammonium acetate, morpholine, and the like. Various binders, including those presently known to persons having ordinary skill in the art, and others, may be used in the instant invention.

Rheology modifiers and other additives may be used in the slurries with some additives being applicable to the stucco as well. For instance, particulate insulators such as vermiculite, perlite, and kieselguhr may be added to the stucco, slurry, or both. Organic particulate or fibrous materials may be added to the shell mold in a slurry or stucco such as plastics, nitrides such as silicon nitride, wood chips, cork, sawdust, corn chips, rice hulls, or any other material that may add to the functionality of the investment casting mold shell or improve the process of making the mold. Synthetic resins, hair, straw, grass, hemp, jute, sisal, bassine or other fibers of vegetable, mineral or animal origin have been found to provide insulating qualities and/or improve the process of making the shell mold. Fibrous materials may be a protein fiber, such as one made from casein, soybeans, peanuts, corn, cellulosic fibers, viscose rayon, aramid fibers, or various other natural or synthetic fibers. Fibers and particles may also be made from quartz glass, fused silica, ceramics, or other inorganic substances. Fibers and particles may be comprised of organic materials such as polystyrene, polyethylene, polyvinyl alcohol, cellulose acetate, cellulose butyrate, ethyl cellulose, acetate butyrate, polyamides such as nylon, vinyl resins, polyester resins, polyacrylic resins, natural rubber, synthetic rubbers, acetate rayon, polycaprolactam, or the like. Metal materials in fibrous or particle form such as aluminum, brass, steel, iron, etc. may be added. Additional rheology modifiers, insulating materials, or other materials, presently known to persons having ordinary skill in the art, and others, may be added to the slurries and optional stuccos of the present invention to improve the characteristics of the mold or the method of making the mold. Other additives which can also be incorporated in the liquid slurry include opacifiers such as titanium dioxide particulates as well as chopped fiberglass fibers which can also prove helpful in maintaining physical integrity of the solid insulating portions and/or layer(s).

The instant invention comprises including at least one insulating portion in an investment casting shell mold. The at least one insulating portion may be included by a process comprising the application of at least one bubbled, preferably aerated, investment casting slurry having a slurry vehicle, advantageously water, and at least one refractory material. The bubbled slurry is preferably applied in at least a portion of at least one layer after a primary layer, and advantageously is applied in a final layer to produce closed porosity in that layer after drying. Preferably, air or other gas is introduced into the slurry in the form of small bubbles by mixing, or injecting gas bubbles with a pump, and entrained therein during a drying process by the use of a foaming agent and a stabilizer. The introduction of gas bubbles into a slurry may also be accomplished chemically by the introduction of reactants into the slurry yielding gaseous products of reaction. It is to be understood that some binders used in the preparation of the slurry may also have attributes of entraining air or gas bubbles in the slurry. Foaming agents such as organic detergents, ionic polymers, nonionic polymers, cationic polymers, and other foaming agents may be used to produce bubbles of gas in the slurry coat. In either case a stabilizer is added to the slurry to maintain the bubbles of gas in the slurry until the coat is dried, forming void spaces or a closed porosity therein. Additionally, the slurry may have a thickener such as a clay (i.e. bentonite clay), fibers (organic or inorganic), polymers, or other materials to affect the rheology or gas bubble entrainment of the slurry. The bubbled layer or portions thereof of the investment casting shell mold, preferably including at least an outer most portion, is subsequently dried resulting in a solid investment casting mold having at least a portion with insulating voids, that is a closed porosity, preferably including at least a portion of an outer layer, thus acting as an insulator of the final investment casting shell mold. The insulating voids are preferably distributed evenly throughout the layer or portion thereof and have a substantially rounded shape which enables the investment casting shell to have an efficient resistance to conductive heat transfer in all directions within the insulating portion. Preferably, the entrained air or other gas decreases the density of the dried insulating portion by at least 1%, and more preferably by more than 2%, increasing the resistance to conductive heat transfer through the investment casting shell mold resulting in a decrease in radiant heat loss therefrom. The radiant heat loss of the resulting mold may be controlled through adjustment of the size and quantity of voids included in the insulating portion and the number as well as the position of insulating portions having been formed with a bubbled slurry. Preferably, at least a 2% decrease in the thermal diffusivity of the portion of the shell mold having the insulating slurry is realized, and more preferably more than 6%, and most preferably 12% or more.

Where there is more than one portion of the shell mold containing voids, they may be interspersed with layers not having been bubbled to maintain sufficient mold strength to withstand metallostatic pressures on casting. It may be desirable to have selected areas of the mold cool at a higher rate than other areas. Differing thicknesses of insulating layers may be applied to various parts of a given shell mold by controlling the areas of application of the bubbled coating or coatings. The entire shell mold need not be coated with an insulating layer as only having a portion of the mold with a lower thermal diffusivity may be advantageous in some applications.

Conventional shell molds often required higher pouring temperatures and preheating of the molds before metal casting to facilitate removal of moisture and removal of air from the mold. It is conventional to preheat the shell molds to about 1800° F. when pouring the metal at around 3000° F. A disadvantage of preheating is that it may require an extra heating operation, and sometimes tends to cause a reaction between the metal being cast and the material forming the mold. The completed insulating shell mold of the present invention has improved thermal properties and the need to preheat the shell mold prior to casting of the metal, as is often required with conventional shell molds, is decreased or may even be eliminated. When preheating is not necessary, metal may be poured directly into the mold shortly after firing. With the insulating material of the present invention, the mold may be filled with molten metal without preheating since the heat is retained within the shell mold for a longer period of time after firing. After pouring, the mold is cooled and the shell is broken away from the cast metal part. When preheating is desirable, the insulated shell mold is removed from the preheating oven. Its inner casting surface defined by the primary layer then cools relatively slowly compared to that of a conventional mold because the multiplicity of voids within the portion(s) of the shell wall made from bubbled slurry, and preferably proximate the exterior of the shell mold, serve as effective insulating means substantially retarding outward heat transfer. Because the casting surface of the mold remains at a satisfactory casting temperature for a greater period of time, little difficulty is involved in carrying out the casting process without prematurely chilling portions of the molten metal as it fills the mold cavity. Very thin sections of metal can therefore be cast with precision, and there is less of a danger that the mold will be inadequately or improperly filled with the molten metal or that shrinkage or metallurgical defects will be exhibited in the completed casting.

Fused silica particulates also provide effective thermal insulation means when disposed in an investment casting shell mold. Therefore, an embodiment of the insulated investing casting shell mold having closed porosity characteristics may also have fused silica therein, preferably having an average particle size up to about 100 mesh United States screen size. In such an embodiment, the closed porosity characteristic may be formed by void spaces existing between the individual non-porous silica particles. An insulating slurry for such an embodiment can be prepared in various ways from a foamed liquid suspension of the fused silica particulates which further contains a suitable foaming agent(s), such as an organic surfactant, a conventional phosphate soap or the like, sodium olefin sulfonate, sodium alkylbenze sulfonate, or other foaming agents known in the art or combinations thereof, and a stabilizer to form a sufficiently stabilized foam in the slurry. The liquid suspension can be physically agitated at ordinary ambient temperatures with mechanical means such as a conventional high speed rotary blender or high speed mixer, to produce a desired frothy condition. Alternately, a foam condition in the liquid slurry can be produced employing other known conventional means such as air pressure combined with mechanical screens, or air injection, to produce relatively small bubbles into the slurry. The desired porous characteristic of the shell mold of this embodiment is produced by first preparing a foamed liquid suspension of the fused silica particulates with a foaming agent and a stabilizer, then converting the foamed liquid suspension to a gel condition and finally removing liquid from the converted gel mass of fused silica particulates after it has been deposited on the shell mold. A representative method for preparation of a slurry having a suitable foamed liquid suspension to form the insulating portion or layer(s) of this embodiment simply mixes the finely divided fused silica particles and the foaming agent and stabilizer together at ambient room temperature conditions for subsequent physical agitation of the mixture sufficient to produce a frothy condition therein. For example, the fused silica particulates are mixed together in water with a foaming agent such as an organic surfactant (anionic, cationic, or nonionic), a conventional phosphate soap or the like, sodium olefin sulfonate, sodium alkylbenze sulfonate, or detergent such as Triton X301 and a colloidal silica binder together with a stabilizer while being mechanically agitated sufficiently to produce a frothy condition in the slurry. Optional inclusion of a water soluble resin in minor amounts has been found to desirably improve stability of the foamed liquid suspension. The stabilizers are added to aid in maintaining the bubbles within the slurry. Suitable stabilizers for this purpose are: alkyl betaine, alkyl ether phosphate, ammonium ether sulfate, capryl betaine, capramidopropyl betaine, cetyl alcohol, cetyl amine oxide, cetamine oxide, cocamidopropyl hydroxysultaine, cocamidopropyl betaine, cocoamidopropylamine oxide, cocamine oxide, cocoamidopropylamine oxide, coconut diethanolamide, coco diethanolamidecoco diethanolamide, coco diethanolamide, coco diethanolamide, coco monoethanolamide, cocamide mea, cocamidopropyl hydroxysultaine, coco monoisopropanolamide, cocamide mipa, decylamine oxide, disodium 2-sulfo fatty acid, disodium coamphodipropionate, disodium cocoamphodiacetate, disodium coamphodipropionate, imidazolinium betaines, lauramine oxide, lauramide dea, laurylamidopropyl betaine, lauryl diethanolamide, lauryl lactyl lactate, lauryl diethanolamide, lauryl monoethanolamide, lauryl-myristyl monoethanolamide, myristyl monoethanolamide, myristylamine oxide, myristyl-cetyl amine oxide, myristamine oxide, polyethylene glycol cocamide, polyethylene glycol lauramide, polyoxyethylene mono glyceride, polyoxyethylene di glyceride, quaternary ammonium salts, sodium laureth sulfate, sodium lauriminodipropionate, sodium cocoaphocacetate, sodium methyl-sulfo-esters, sodium lauroyl sarcosinate, steramine oxide.

Gelling of the foamed liquid suspension before bubble collapse may be used to preserve sufficient closed porosity in the dry insulation after liquid removal. Conversion of the foamed slurry to a gel condition can be carried out in various ways to include conventional freezing or employing already known chemical gelling agents such as ammonium chloride. The converted gel fused silica particulates can thereafter be deposited on the shell mold for in situ removal of water employing conventional means such as drying at ordinary room or elevated temperatures, and the like. Alternatively, gelling of the slurry can be accomplished after it has been deposited on the shell mold.

Another embodiment incorporates insulating portions or layers into investment casting shell molds made in the traditional manner as is known in the art, minimizing process complexities and associated costs. In this embodiment, an insulating slurry having substantially the same constituents as a non-insulating slurry, except for the addition of air and foaming agents and stabilizers, is used in making investment casting shell molds. This is accomplished by first mixing at least one refractory material with an aqueous colloidal silica sol to form a refractory prime coat slurry and mixing at least one refractory material with an aqueous colloidal silica sol to form a refractory backup coat slurry. Typically the prime coat slurry has finer particles and/or fibers, or no fibers, and a higher viscosity than the backup slurry. However, the slurries may have the same composition thus eliminating the need to mix a primary and backup slurry. In which case, only one slurry need be mixed serving as both the primary and backup coat slurry. A coating of the prime coat slurry is placed onto an fugitive pattern of thermoplastic material to produce a prime coated preform, a stucco of refractory material is then placed onto the prime coated perform. The stuccoed, prime coated perform is then dried. A backup coating is placed onto the stuccoed, prime coated preform after which a stucco of refractory material is placed onto the back-up coated preform to produce a stuccoed, back-up coated perform which is again dried. The process of applying a backup coating, stucco, and drying is repeated until a nearly desired mold thickness is obtained. Finally, a bubbled slurry, having the same or different composition as the prime or backup slurry, is then applied, having been treated by the introduction of gas, a foaming agent, and a stabilizer, transforming the slurry into an insulating slurry. The insulating slurry may be of the same or different composition as the prime or backup coat slurry. The mold shell is then dipped into the insulating slurry optionally after which stucco is applied and the insulated mold is dried to produce closed porosity therein. A plurality of insulating layers may be applied in a like manner until the shell mold has a desired thickness and portions having voids to produce a green shell mold. The green shell mold is then heated to a temperature sufficient to produce a fired ceramic shell mold having desired thermal properties as a result of the closed porosity therein.

EXAMPLES

In order that the present invention may be more fully understood, examples will now be presented describing alternative process steps that have been taken to form the insulated investment casting shell mold and characteristics of the resulting shell molds. It is to be understood that these examples are not to limit the present invention but are given to describe several embodiments of the process of making and the characteristics of embodiments of the shell mold.

Examples 1-20

Insulated investment casting foam slurries were individually prepared with the constituents as shown in FIG. 1 by the following steps:

1362 grams of colloidal silica were added to a mixing vessel.

150 ml of water was added to the mixing vessel.

The mixing vessel was placed in a high shear mixer having a 3 inch high shear mixing propeller.

The propeller was lowered into the container to within ½ inch of the bottom of the mixing vessel.

2500 grams of fused silica were added to a dry container.

An amount of bentonite clay thickener was optionally added to the dry container of the example as indicated in the table of FIG. 1.

An amount of E385F™ fibers were optionally added to the dry container of the example as indicated in the table of FIG. 1.

The dry materials in the dry container were poured on top of the liquid materials in the mixing vessel.

The high shear mixer was turned on to provide approximately 500 rpm to the high shear mixing propeller.

The liquid and dry materials were mixed until all dry materials were visibly wetted; the sides of the mixing vessel were scraped with a spatula as necessary to contact all dry materials with the liquids.

An amount of foaming agent was placed into a syringe as indicated in the table in FIG. 1.

An amount of stabilizer was placed into a separate syringe as indicated in the table in FIG. 1.

The syringe having the foaming agent and the syringe having the stabilizer of the example were simultaneously added into the mixing vortex of the mixing vessel.

The mixing vessel of the example was mixed until resultant lumps disappeared.

The high shear mixer was turned off and the resulting slurry of the example was visually observed.

The above procedure was repeated for each of the examples, 1-20. The E385F™ fibers that were optionally added in varying amounts to selected examples are Fibrel® fibers comprised of polyethylene and are manufactured by MiniFibers, Inc. and have an average length of 0.7 mm and an average diameter of 15 µl. The fused silica used in the examples was Min-Sil®, fused silica, manufactured by Minco®. The colloidal silica used was Nalco 1130®, manufactured by Nalco Chemical Company. The foaming agent used in examples 1-10 was Bio-Terge®, AS-40™, a sodium olefin sulfonate manufactured by Stepan Co., and in examples 11-20 was Bio-Soft®, D40™, a linear sodium alkylbenze sulfonate manufactured by Stepan Co. The stabilizer used in each example was Cedephos®, FA600™, an alkyl ether phosphate also manufactured by Stepan Co.

The slurries of each of the examples 1-20 visually appeared to be of a workable consistency appropriate to coat a pattern. A separate pattern was dipped into each slurry of each example 1-20 and a thickened coat was visually observed. Therefore, the slurry of each example 1-20 produced a slurry having entrained air within the closed porosity thereof that remained in the slurry adding to the thickness of the coat, thus providing an insulating layer.

It is important to note that only 20 examples were tested with varying makeup in each, yet it is anticipated that other thickeners, fibers, foaming agents, and stabilizers and concentrations thereof will yield slurries providing an insulating layer to an investment shell mold and are considered to be within the scope of the instant patent. For instance, thickeners such as arabic gum and/or potassium silicate may be used as well as a variety of other thickeners as is known in the art as well as other stabilizers.

Example 21

A flat shell section was produced by first dipping a wax plate pattern into a slurry having 3711 g of fused silica, 175 g water, 1362 g colloidal silica, and 140 g Minco HP latex. followed by application of Minco 30×50 stucco. The shell mold was then dipped into the slurry and stucco was applied a plurality of times resulting in a coating of approximately 0.5" in thickness on the wax pattern. The shell mold's edges were ground allowing removal of the shell in plate form from the wax pattern. Thermal diffusivity, specific heat capacity, bulk density, and thermal conductivity were measured at varying temperatures, the results of which appear in the table of FIG. 2. Thermal diffusivity and specific heat capacity tests were performed according to the specifications of ASTM E1461 test method.

Example 22

An insulating plate was produced by pouring a slurry produced according to the procedure of Example 1 into a baking pan to a level of approximately 0.5" and allowed to dry. Upon drying, the insulating plate was removed from the pan. Thermal diffusivity, specific heat capacity, bulk density, and thermal conductivity were measured at varying temperatures, the results of which appear in the table of FIG. 2. Thermal diffusivity and specific heat capacity tests were performed according to the specifications of ASTM E1461 test method.

The shell mold of Example 21 serves as a baseline for comparison with the insulating layer of Example 22. As is shown with the data of FIG. 2, the bulk density of the shell mold of Example 21 is approximately 2.4% greater than the insulating material of Example 22. This difference in density is due to the entrained air in the closed porosity of the insulating slurry of Example 22. A notable decrease in thermal conductivity and specific heat capacity is also shown with the introduction of entrained air into the slurry. Most importantly, the thermal diffusivity of the insulating material of Example 22 is shown to be about 6% lower than the shell mold of Example 21 at the higher temperature and more than 12% lower at the lower temperature. This test data demonstrates the insulating effectiveness of the insulating layer of the instant invention. It is anticipated that the addition of alternative or an increased amount of foamers and stabilizers, higher mixing speeds or other methods of introducing air bubbles into the slurry, or other process improvements will result in an insulating layer having even greater insulating parameters and are considered to be within the scope of the instant invention.

The invention claimed is:

1. A method of making an insulated investment casting shell mold comprising the steps of:
   mixing at least one refractory material with a first slurry vehicle to form a first slurry;
   coating a fugitive pattern of an article to be cast with said first slurry forming a coated fugitive pattern having an innermost layer;
   providing a second slurry vehicle;
   mixing at least one refractory material with said second slurry vehicle to form a second slurry;
   adding at least one foaming agent and at least one stabilizer to said second slurry;
   introducing small, stable gas bubbles, compared to gas bubbles formed by the foaming agent alone, into said second slurry containing said foaming agent and said stabilizer;
   entraining said small, stable gas bubbles in said second slurry containing said foaming agent and said stabilizer thereby causing said second slurry to maintain said gas bubbles to form a bubbled insulating slurry;
   applying said bubbled insulating slurry to at least a portion of said coated fugitive pattern to form an insulating portion having closed porosity therein;
   drying said insulating portion;
   removing said fugitive pattern from said innermost layer forming a green shell mold; and
   firing said green shell mold to form said insulated investment casting shell mold with a reduced thermal diffusivity as a result of said closed porosity thereby slowing the cooling of material cast within said insulated investment casting shell mold.

2. The method of making an insulated investment casting shell mold of claim 1 wherein said step of coating a fugitive pattern with a first slurry is followed with the steps of:
   dusting a stucco to said innermost layer, said stucco having at least one refractory material; and
   drying said coated fugitive pattern.

3. The method of making an insulated investment casting shell mold of claim 2 wherein said step of drying said coated fugitive pattern is followed with the steps of:
   coating said coated fugitive pattern with another slurry forming a backup coat on said coated fugitive pattern, said backup coat having at least one refractory material in a slurry vehicle;
   dusting a stucco onto said backup coat, said stucco having at least one refractory material; and
   drying said backup coat.

4. The method of making an insulated investment casting shell mold of claim 3 wherein said coating, dusting, and drying steps are performed a plurality of times forming a plurality of backup coats on said fugitive pattern.

5. The method of making an insulated investment casting shell mold of claim 1 wherein said foaming agent is selected from the group consisting of a conventional phosphate soap, sodium olefin sulfonate, sodium alkylbenze sulfonate, or combinations thereof.

6. The method of making an insulated investment casting shell mold of claim 1 wherein said foaming agent is selected from the group consisting of organic detergents, ionic polymers, nonionic polymers, cationic polymers, or combinations thereof.

7. The method of making an insulated investment casting shell mold of claim 1 wherein said step of applying said bubbled insulating slurry comprises dipping at least a portion of said coated fugitive pattern into said bubbled insulating slurry and is followed by a step of dusting said bubbled insulating slurry with a stucco and drying to form said insulating portion having said closed porosity.

8. The method of making an insulated investment casting shell mold of claim 1 wherein said insulating portion forms a part of an outer-most surface of said insulated investment casting shell mold.

9. The method of making an insulated investment casting shell mold of claim 1 wherein a plurality of said insulating portions are applied to said coated fugitive pattern.

10. The method of making an insulated investment casting shell mold of claim 9 wherein at least two of said plurality of insulating portions have at least one coating applied therebetween.

11. The method of making an insulated investment casting shell mold of claim 1 wherein said bubbled insulating slurry has bubbles of air entrained therein by mixing said second slurry containing said foaming agent and said stabilizer at a high speed in a high shear mixer.

12. The method of making an insulated investment casting shell mold of claim 1 wherein said bubbled slurry has bubbles of gas entrained therein by the introduction of pressurized gas into said second slurry containing said foaming agent and said stabilizer.

13. The method of making an insulated investment casting shell mold of claim 1 wherein said slurries contain colloidal silica sol.

14. The method of making an insulated investment casting shell mold of claim 1 wherein said stabilizer is selected from the group consisting of alkyl betaine, alkyl ether phosphate, ammonium ether sulfate, capryl betaine, capramidopropyl betaine, cetyl alcohol, cetyl amine oxide, cetamine oxide, cocamidopropyl hydroxysultaine, cocamidopropyl betaine, cocoamidopropylamine oxide, cocamine oxide, cocoamidopropylamine oxide, coconut diethanolamide, coco diethanolamidecoco diethanolamide, coco diethanolamide, coco diethanolamide, coco monoethanolamide, cocamide mea, cocamidopropyl hydroxysultaine, coco monoisopropanolamide, cocamide mipa, decylamine oxide, disodium 2-sulfo fatty acid, disodium coamphodipropionate, disodium cocoamphodiacetate, disodium coamphodipropionate, imidazolinium betaines, lauramine oxide, lauramide dea, laurylamidopropyl betaine, lauryl diethanolamide, lauryl lactyl lactate, lauryl diethanolamide, lauryl monoethanolamide, laurylmyristyl monoethanolamide, myristyl monoethanolamide, myristylamine oxide, myristyl-cetyl amine oxide, myristamine oxide, polyethylene glycol cocamide, polyethylene glycol lauramide, polyoxyethylene mono glyceride, polyoxyethylene di glyceride, quaternary ammonium salts, sodium laureth sulfate, sodium lauriminodipropionate, sodium cocoaphocacetate, sodium methyl-sulfo-esters, sodium lauroyl sarcosinate, steramine oxide, or combinations thereof.

15. The method of making an insulated investment casting shell mold of claim 1 wherein said stabilizer is alkyl ether phosphate.

16. A method of making an insulated investment casting shell mold comprising:
Mixing at least one refractory material with a slurry vehicle forming a prime coat slurry; mixing at least one refractory material with a slurry vehicle forming a backup coat slurry; said prime coat slurry having the same or different composition as said backup coat slurry,
applying a coating of said prime coat slurry onto a fugitive pattern to produce a prime coated pattern;
applying stucco onto said prime coated pattern;
drying the stuccoed, prime coated pattern;
applying a plurality of separate coatings of said backup coat slurry onto the stuccoed, prime coated pattern to produce a backup coated pattern;
after each of said separate applications of said backup coat, applying stucco onto the backup coated pattern and drying each of said stucco applications;
providing a third slurry having the same or different composition as said prime or said backup slurry and adding at least one foaming agent and at least one stabilizer to said third slurry;
introducing small, stable gas bubbles, compared to gas bubbles formed by the foaming agent alone, into said third slurry containing said foaming agent and said stabilizer;
entraining a plurality of said small, stable gas bubbles in said third slurry containing said stabilizer and said foaming agent forming an insulating slurry having closed porosity therein;
applying said insulating slurry onto at least a portion of said backup coated pattern forming a green shell mold;
removing said pattern from said green shell mold; and
firing said green shell mold forming said insulated investment casting shell mold with a reduced thermal diffusivity as a result of said closed porosity thereby slowing the cooling of material cast within said insulated investment casting shell mold.

17. The method of making an insulated investment casting shell mold of claim 16 wherein said foaming agent is selected from the group consisting of a conventional phosphate soap, sodium olefin sulfonate, sodium alkylbenze sulfonate, or combinations thereof.

18. The method of making an insulated investment casting shell mold of claim 17 wherein said stabilizer is selected from the group consisting of alkyl betaine, alkyl ether phosphate, ammonium ether sulfate, capryl betaine, capramidopropyl betaine, cetyl alcohol, cetyl amine oxide, cetamine oxide, cocamidopropyl hydroxysultaine, cocamidopropyl betaine, cocoamidopropylamine oxide, cocamine oxide, cocoamidopropylamine oxide, coconut diethanolamide, coco diethanolamidecoco diethanolamide, coco diethanolamide, coco diethanolamide, coco monoethanolamide, cocamide mea, cocamidopropyl hydroxysultaine, coco monoisopropanolamide, cocamide mipa, decylamine oxide, disodium 2-sulfo fatty acid, disodium coamphodipropionate, disodium cocoamphodiacetate, disodium coamphodipropionate, imidazolinium betaines, lauramine oxide, lauramide dea, laurylamidopropyl betaine, lauryl diethanolamide, lauryl lactyl lactate, lauryl diethanolamide, lauryl monoethanolamide, laurylmyristyl monoethanolamide, myristyl monoethanolamide, myristylamine oxide, myristyl-cetyl amine oxide, myristamine oxide, polyethylene glycol cocamide, polyethylene glycol lauramide, polyoxyethylene mono glyceride, polyoxyethylene di glyceride, quaternary ammonium salts, sodium laureth sulfate, sodium lauriminodipropionate, sodium cocoaphocacetate, sodium methyl-sulfo-esters, sodium lauroyl sarcosinate, steramine oxide, or combinations thereof.

19. The method of making an insulated investment casting shell mold of claim 16 wherein said stabilizer is alkyl ether phosphate.

20. A method of making a bubbled insulating slurry for use in an insulated investment casting shell mold with a reduced thermal diffusivity thereby slowing the cooling of material cast within said insulated investment casting shell mold comprising the steps of:
providing a slurry vehicle;
mixing at least one refractory material with said slurry vehicle to form a slurry;
adding at least one stabilizer to said slurry;
adding at least one foaming agent to said slurry;
introducing small, stable gas bubbles, compared to gas bubbles formed by the foaming agent alone, into said slurry containing said foaming agent and said stabilizer;
entraining said small, stable gas bubbles in said slurry containing said stabilizer and said foaming agent thereby causing said slurry to maintain said gas bubbles to form a bubbled insulating slurry having closed porosity therein.

21. The method of making the bubbled insulating slurry for use in an insulated investment casting shell mold of claim 20 wherein said at least one foaming agent is selected from the group consisting of a conventional phosphate soap, sodium olefin sulfonate, sodium alkylbenze sulfonate, or combinations thereof.

22. The method of making the bubbled insulating slurry for use in an insulated investment casting shell mold of claim 20 wherein said bubbled insulating slurry has bubbles of gas entrained therein by mixing said slurry containing said stabilizer and foaming agent at a high speed in a high shear mixer.

23. The method of making the bubbled insulating slurry for use in an insulated investment casting shell mold of claim 20 wherein said bubbled insulating slurry has bubbles of gas entrained therein by the introduction of pressurized gas into said slurry containing said stabilizer and said foaming agent.

24. The method of making a bubbled insulating slurry of claim 20 wherein said stabilizer is alkyl ether phosphate.

25. The method of making a bubbled insulating slurry of claim 20 wherein said stabilizer is selected from the group consisting of alkyl betaine, alkyl ether phosphate, ammonium ether sulfate, capryl betaine, capramidopropyl betaine, cetyl alcohol, cetyl amine oxide, cetamine oxide, cocamidopropyl hydroxysultaine, cocamidopropyl betaine, cocoamidopropylamine oxide, cocamine oxide, cocoamidopropylamine oxide, coconut diethanolamide, coco diethanolamidecoco diethanolamide, coco diethanolamide, coco diethanolamide, coco monoethanolamide, cocamide mea, cocamidopropyl hydroxysultaine, coco monoisopropanolamide, cocamide mipa, decylamine oxide, disodium 2-sulfo fatty acid, disodium coamphodipropionate, disodium cocoamphodiacetate, disodium coamphodipropionate, imidazolinium betaines, lauramine oxide, lauramide dea, laurylamidopropyl betaine, lauryl diethanolamide, lauryl lactyl lactate, lauryl diethanolamide, lauryl monoethanolamide, lauryl-myristyl monoethanolamide, myristyl monoethanolamide, myristylamine oxide, myristyl-cetyl amine oxide, myristamine oxide, polyethylene glycol cocamide, polyethylene glycol lauramide, polyoxyethylene mono glyceride, polyoxyethylene di glyceride, quaternary ammonium salts, sodium laureth sulfate, sodium lauriminodipropionate, sodium cocoaphocacetate, sodium methyl-sulfo-esters, sodium lauroyl sarcosinate, steramine oxide, or combinations thereof.

* * * * *